US012469948B2

(12) United States Patent
Tang et al.

(10) Patent No.: US 12,469,948 B2
(45) Date of Patent: Nov. 11, 2025

(54) ACTIVE ANTENNA UNITS AND BASE STATION ANTENNAS WITH HEAT DISSIPATION MEMBERS

(71) Applicant: Outdoor Wireless Networks LLC, Claremont, NC (US)

(72) Inventors: Chengcheng Tang, Murphy, TX (US); Joy Huang, Plano, TX (US); Bo Wu, Richardson, TX (US); Samantha Merta, Plano, TX (US); Haifeng Li, Richardson, TX (US); XiaoHua Hou, Richardson, TX (US)

(73) Assignee: Outdoor Wireless Networks LLC, Richardson, TX (US)

( * ) Notice: Subject to any disclaimer, the term of this patent is extended or adjusted under 35 U.S.C. 154(b) by 252 days.

(21) Appl. No.: 18/481,459

(22) Filed: Oct. 5, 2023

(65) Prior Publication Data

US 2024/0120635 A1 Apr. 11, 2024

Related U.S. Application Data

(60) Provisional application No. 63/378,404, filed on Oct. 5, 2022.

(51) Int. Cl.

| | |
|---|---|
| ***H01Q 1/02*** | (2006.01) |
| ***H01Q 1/24*** | (2006.01) |
| ***H01Q 1/42*** | (2006.01) |
| ***H01Q 15/00*** | (2006.01) |

(52) U.S. Cl.
CPC ............... *H01Q 1/02* (2013.01); *H01Q 1/246* (2013.01); *H01Q 1/42* (2013.01); *H01Q 15/0013* (2013.01)

(58) Field of Classification Search
CPC ............ H01Q 1/02; H01Q 1/246; H01Q 1/42; H01Q 15/0013
See application file for complete search history.

(56) References Cited

U.S. PATENT DOCUMENTS

| | | | |
|---|---|---|---|
| 7,043,280 | B1 | 5/2006 | Shields et al. |
| 7,346,311 | B1 | 3/2008 | Schwartz |
| 11,469,487 | B2 | 10/2022 | Xu et al. |
| 11,482,774 | B2 | 10/2022 | Hou et al. |
| 2001/0048397 | A1 | 12/2001 | Smith |
| 2008/0252552 | A1 | 10/2008 | Goebel et al. |
| 2010/0182213 | A1 | 7/2010 | Obermaier et al. |

(Continued)

FOREIGN PATENT DOCUMENTS

| | | | |
|---|---|---|---|
| JP | 2004039857 | A | 2/2004 |
| JP | 2017063288 | A | 3/2017 |

(Continued)

OTHER PUBLICATIONS

Ben A. Munk, Frequency Selective Surfaces: Theory and Design, ISBN: 978-0-471-37047-5; DOI:10.1002/0471723770; Apr. 2000, Copyright © 2000 John Wiley & Sons, Inc.

*Primary Examiner* — Hoang V Nguyen
(74) *Attorney, Agent, or Firm* — Myers Bigel, P.A.

(57) ABSTRACT

Active antenna units and/or base station antennas are provided that include a reflector body with heat dissipation structures that can be directly exposed to environmental conditions during use. The heat dissipation structures have frequency selective surfaces and can be formed of sheet metal or provided as separate extruded or die cast members that can be coupled to the reflector body.

22 Claims, 12 Drawing Sheets

(56) References Cited

U.S. PATENT DOCUMENTS

| | | | |
|---|---|---|---|
| 2011/0032158 | A1 | 2/2011 | Rodger et al. |
| 2011/0209864 | A1 | 9/2011 | Figus et al. |
| 2013/0222201 | A1 | 8/2013 | Ma et al. |
| 2017/0214150 | A1 | 7/2017 | Zhao et al. |
| 2018/0219277 | A1 | 8/2018 | Hirata et al. |
| 2018/0316086 | A1 | 11/2018 | Lehman et al. |
| 2018/0358710 | A1* | 12/2018 | Toyao .................. H01Q 15/148 |
| 2022/0223992 | A1 | 7/2022 | Ueda |

FOREIGN PATENT DOCUMENTS

| | | | |
|---|---|---|---|
| WO | 2011068562 | A1 | 6/2011 |
| WO | 2019236203 | A2 | 12/2019 |
| WO | 2020072880 | A1 | 4/2020 |
| WO | 2020261706 | A1 | 12/2020 |
| WO | 2021195040 | A2 | 9/2021 |
| WO | 2023029431 | A1 | 3/2023 |
| WO | 2023035095 | A1 | 3/2023 |
| WO | 2023168924 | A1 | 9/2023 |

* cited by examiner

ACTIVE ANTENNA UNITS AND BASE STATION ANTENNAS WITH HEAT DISSIPATION MEMBERS

RELATED APPLICATIONS

This patent application claims the benefit of and priority to U.S. Provisional Patent Application Ser. No. 63/378,404, filed Oct. 5, 2022, the contents of which are hereby incorporated by reference as if recited in full herein.

BACKGROUND

The present invention generally relates to radio communications and, more particularly, to base station antennas for cellular communications systems.

Cellular communications systems are well known in the art. In a cellular communications system, a geographic area is divided into a series of regions or "cells" that are served by respective macrocell base stations. Each macrocell base station may include one or more base station antennas that are configured to provide two-way radio frequency ("RF") communications with subscribers that are within the cell served by the base station. In many cases, each base station is divided into "sectors." In one common configuration, a hexagonally-shaped cell is divided into three 120° sectors in the azimuth plane, and each sector is served by one or more macrocell base station antennas that have an azimuth Half Power Beamwidth (HPBW) of approximately 65°. So-called small cell base stations may be used to provide service in high-traffic areas within portions of a cell. Typically, the base station antennas are mounted on a tower or other raised structure, with the radiation patterns that are generated by the base station antennas directed outwardly.

Certain components of base station antennas can generate heat. For example, radios that may be mounted adjacent, on or in a base station antenna can generate heat. In the past, external heat sink fins have been provided in a chassis or body of the radio unit/sub-unit and in housings of base station antennas to help dissipate that generated heat. Further details of example conventional antennas can be found in co-pending WO 2019/236203 and WO 2020/072880, the contents of which are hereby incorporated by reference as if recited in full herein.

SUMMARY

Embodiments of the invention provide base station antennas with a heat dissipation member that includes a frequency selective substrate and/or surface (FSS) in thermal communication with a radio and a reflector to provide at least part of a thermal heat pathway from the radio to local environment such as outside air.

Embodiments of the invention are directed to a reflector assembly for a base station antenna that includes a reflector body and at least one heat dissipation member coupled to and residing forward of the reflector body. The at least one heat dissipation member includes a frequency selective surface.

The at least one heat dissipation member can be a plurality of heat dissipation members that can be laterally and/or longitudinally spaced apart across a respective width and/or length dimension of the reflector body.

The reflector assembly can include an array of radiating elements that project forward of the reflector body. The at least one heat dissipation member comprises a first heat dissipation member that resides between a first row or column of radiating elements of the array of radiating and a second row or column of radiating elements.

The reflector assembly can include a radome coupled to the reflector body. The at least one heat dissipation member can be provided as an external cover arranged with the frequency selective surface residing in front of the radome. The external cover is thermally coupled to the reflector body.

At least part of the frequency selective surface can be parallel to a primary surface of the reflector body and can extend over at least 50% of a length and width of the front of the radome.

The reflector assembly can have a plurality of metal legs that extend laterally from the reflector body and couple to a plurality of spaced apart support members that reside outside the radome and that extend in a front-to-back direction of the base station antenna.

The at least one heat dissipation member can be metal. The frequency selective surface can be provided as an array of unit cells.

The at least one heat dissipation member can include at least one wall that extends in a front-to-back direction of the base station antenna. The at least one wall can have a solid metal portion that merges into the frequency selective surface. The solid metal portion can terminate behind a front surface the radiating elements and defines a radio frequency isolation fence.

The reflector assembly can further include a radome coupled to the reflector body and an array of radiating elements that project forward of the reflector body inside the radome. The at least one heat dissipation member can have a wall with a first portion that extends inside the radome and a second portion that projects through an aperture in the radome to reside outside the radome.

The wall of the at least one heat dissipation member can be provided by a pair of adjacent walls that are spaced apart and define a channel therebetween with a rear of the channel being closed and attached to the reflector body. A breathable, water-resistant material can be coupled to a respective at least one heat dissipation member to seal the channel adjacent to and/or outside the radome.

The reflector assembly can further include a radome coupled to the reflector body and enclosing a plurality of radiating elements between the reflector body and the radome. The radome can have a seal member that can slidably receive a respective heat dissipation member with part of the respective heat dissipation member residing outside the radome in front of the seal and another part resides inside the radome behind the seal member.

Other aspects are directed to an active antenna unit that includes: a reflector body; a plurality of radiating elements projecting forward of the reflector body; a radome coupled to the reflector body and enclosing the plurality of radiating elements; and at least one heat dissipation member that is coupled to the reflector body. The at least one heat dissipation member has a frequency selective surface which is at least partially outside the radome.

The active antenna unit can further include a radio and cavity filters residing behind the reflector body.

The at least one heat dissipation member can be a plurality of heat dissipation members. The plurality of heat dissipation members can each a have a solid metal rear portion that is coupled to the reflector body and that can merge into the frequency selective surface at a location behind a front of the radiating elements. The plurality of heat dissipation members are laterally and/or longitudinally spaced apart across a width and/or length dimension of the reflector body.

The plurality of radiating elements can be provided as an array of radiating elements that project forward of the reflector body. The at least one heat dissipation member can have a first heat dissipation member that resides between a first row or column of adjacent radiating elements of the array of radiating elements and a second row or column of adjacent radiating elements.

The at least one heat dissipation member can be provided as an external cover with the frequency selective surface arranged to reside at least partially in front of the radome, and the external cover is thermally coupled to the reflector body.

At least part of the frequency selective surface can be parallel to a primary surface of the reflector body and extends over at least 50% of a length and width of the front of the radome.

The at least one heat dissipation member can be metal. The frequency selective surface can be provided as an array of unit cells.

The at least one heat dissipation member can have at least one wall that extends in a front-to-back direction. The at least one wall can have a solid metal portion that merges into the frequency selective surface. The solid metal portion can terminate behind a front surface the radiating elements and defines a radio frequency isolation fence.

The at least one heat dissipation member can have a wall with a first portion that resides inside the radome and a second portion that projects forward through an aperture in the radome to reside outside the radome.

The wall of the at least one heat dissipation member can be provided by a pair of adjacent walls that are spaced apart and define a channel therebetween with a rear of the channel attached to the reflector body. A breathable, water-resistant material can be coupled to a respective at least one heat dissipation member to seal the channel adjacent to and/or outside the radome.

The active antenna unit can further include a seal member with an open through channel coupled to the aperture of the radome and that can slidably receive a respective heat dissipation member.

Still other aspects are directed to a base station antenna that includes: a passive antenna with a housing and an active antenna unit with a radome, residing behind the housing. The active antenna unit can have at least one heat dissipation member with a frequency selective surface that is at least partially external to the radome and resides behind the housing.

The at least one heat dissipation member can have a wall with a first portion that resides inside the radome and a second portion that projects forward through an aperture in the radome to reside outside the radome.

The wall of the at least one heat dissipation member can be provided by a pair of adjacent walls that are spaced apart and define a channel therebetween with a rear of the channel attached to the reflector body. A breathable, water-resistant material can be coupled to a respective at least one heat dissipation member to seal the channel adjacent to and/or outside the radome.

The base station antenna can further include a seal member with an open through channel coupled to the aperture of the radome that slidably receives a respective heat dissipation member.

The active antenna unit can further include a reflector body coupled to the at least one heat dissipation member and an array of radiating elements that project forward of the reflector body. The at least one heat dissipation member can have a first heat dissipation member that resides between a first row or column of adjacent radiating elements of the array of radiating elements and a second row or column of adjacent radiating elements.

The active antenna unit can have a reflector body coupled to the at least one heat dissipation member and an array of radiating elements that project forward of the reflector body. The at least one heat dissipation member can be provided as an external cover with the frequency selective surface arranged to reside in front of the radome.

At part of the frequency selective surface can be parallel to a primary surface of the reflector body and can extend over at least 50% of a length and width of the front of the radome.

The at least one heat dissipation member can be metal and the frequency selective surface can be provided as an array of unit cells.

The external cover can be thermally coupled to the reflector body by a plurality of metal leg segments that extend laterally from the reflector body and couple to a plurality of spaced apart support members that reside outside the radome and extend in a front-to-back direction of the base station antenna.

It should be noted that various aspects of the present disclosure described for one embodiment may be included in other different embodiments, even though specific description is not made for the other different embodiments. In other words, all the embodiments and/or features of any embodiment may be combined in any manner and/or combination, as long as they are not contradictory to each other.

BRIEF DESCRIPTION OF THE DRAWINGS

FIG. 178 is an enlarged side perspective view of an example unit cell configuration for a frequency selective surface/substrate for a heat dissipation member and/or grid cover according to embodiments of the present invention.

DETAILED DESCRIPTION

Figure 1:
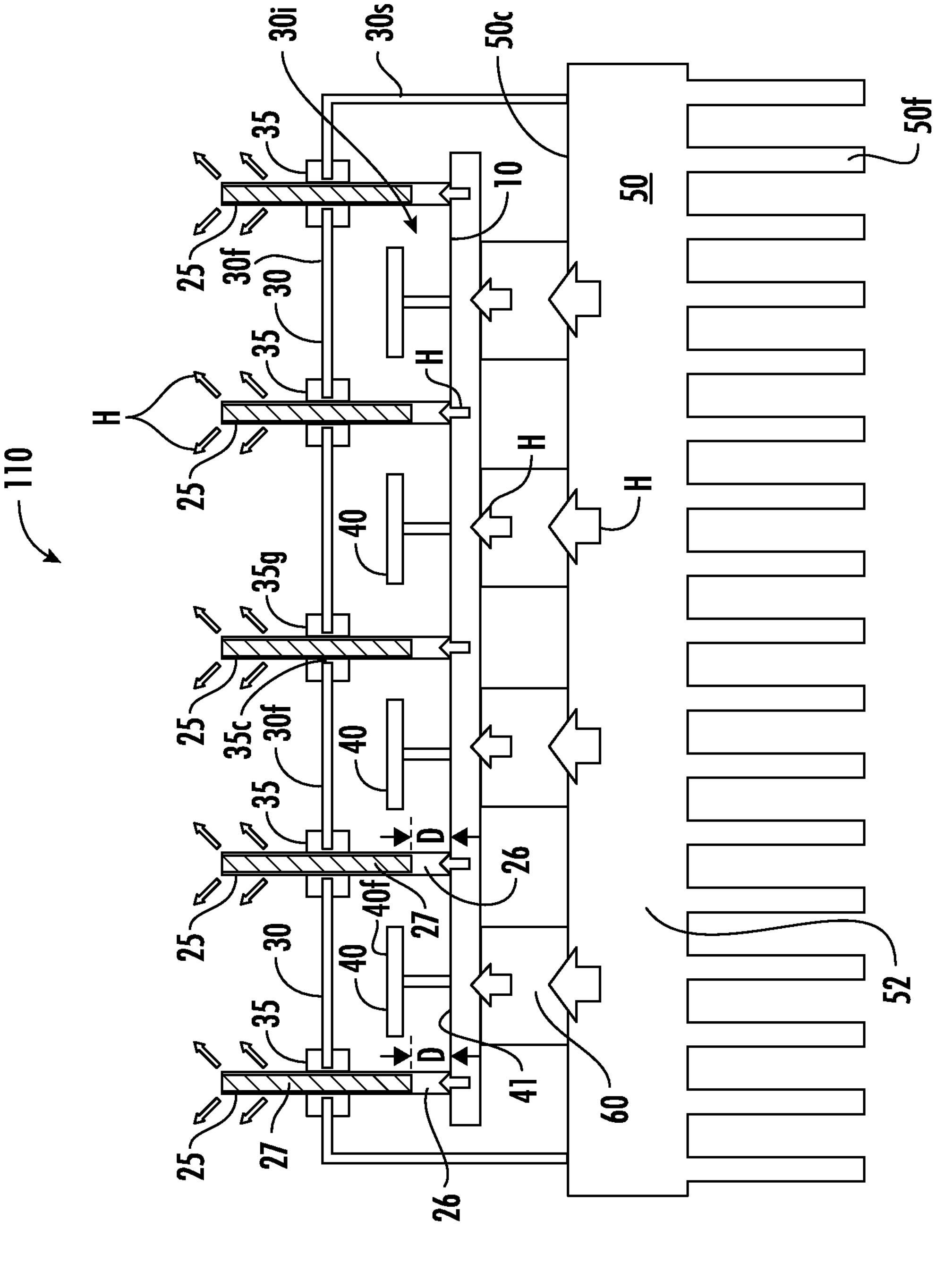
FIG. 1 is simplified lateral cross-section view of an active antenna unit with heat dissipation members providing a heat transfer path according to embodiments of the present invention.
Figure 2:
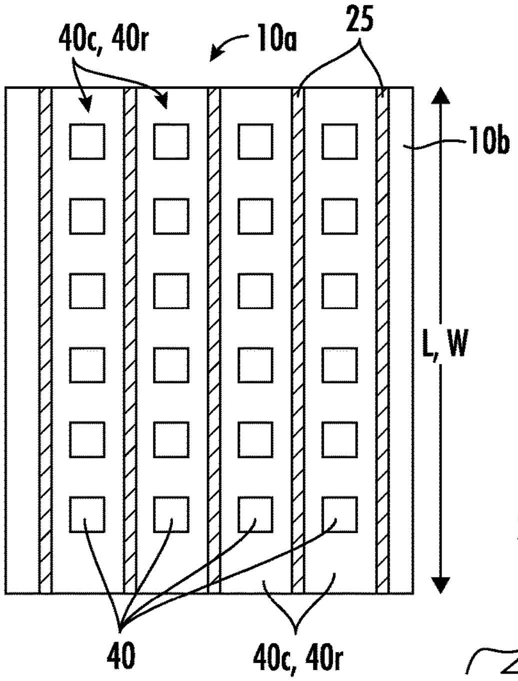
FIG. 2 is a front view of components of the active antenna unit shown in FIG. 1, shown without the radome.
Figure 3:
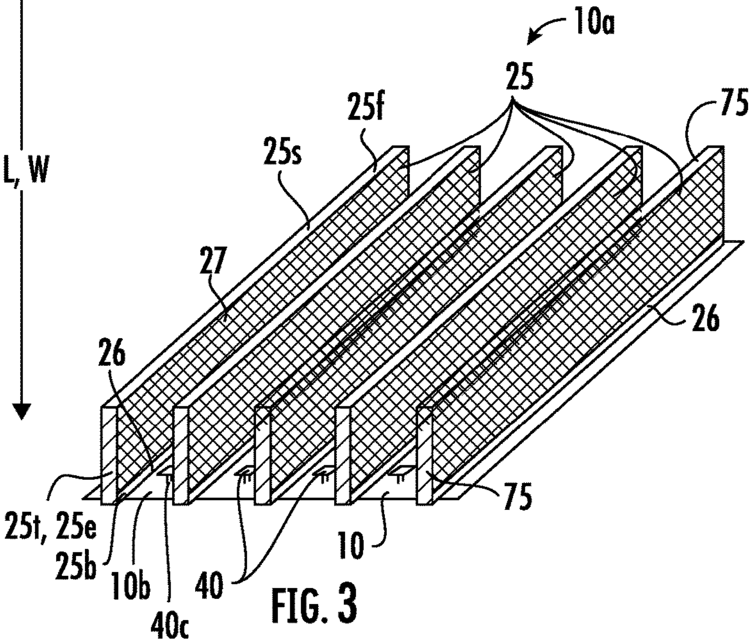
FIG. 3 is a side perspective view of components of the active antenna unit shown in FIG. 1, shown without the radome.
Figure 4:
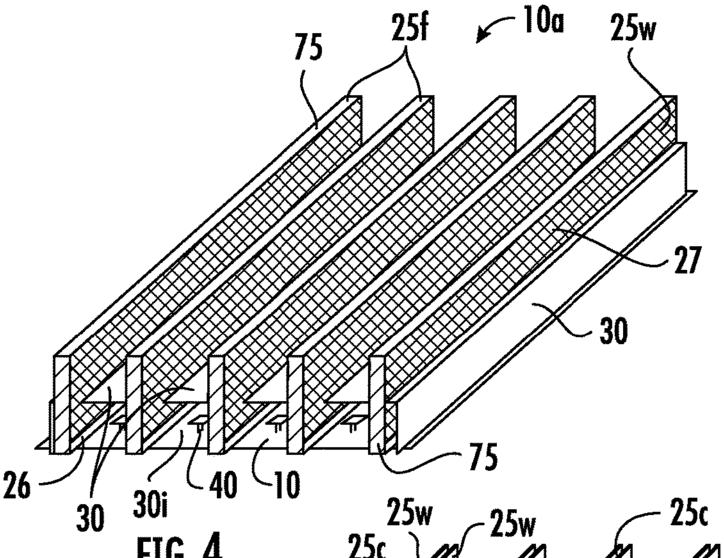
FIG. 4 is a side perspective view of the components of the active antenna unit shown in FIG. 3, shown with the radome.

The demand for cellular communications capacity has been increasing at a high rate. As a result, the number of base station antennas has proliferated in recent years. Base station antennas are both relatively large and heavy and, as noted above, are typically mounted on antenna towers. Due to the wind loading on the antennas and the weight of the antennas and associated radios, cabling and the like, antenna towers must be built to support significant loads. This increases the cost of the antenna towers.

In the description that follows, active antenna units for base station antennas and the components thereof are described using terms that assume that the base station antennas are mounted for use on a tower with the longitudinal axis of the antenna extending along a vertical (or near vertical) axis and the front surface of the antenna mounted opposite the tower or other mounting structure pointing toward the coverage area for the antenna.

Embodiments of the present invention will now be discussed in greater detail with reference to the attached figures.

Die cast or extruded reflector structures with integrated heat sinks in an active antenna unit are described in co-pending PCT/CN2021/116847, the contents of which are hereby incorporated by reference as if recited in full herein. The present inventive concept provides alternative heat dissipation structure that can provide additional or alternative heat flow paths from a heat source to a location outside a radome.

Referring to FIGS. 1-5, an active antenna unit 110 comprising a reflector 10 with a reflector body 10*b* is shown. A plurality of radiating elements 40 project forward of the reflector 10 and a radio 50 can reside behind the reflector 10. A radome 30 encloses the reflector 10 and radiating elements 40 and can be coupled to the radio 50. As is well known to those of skill in the art, feed boards 41 can reside on the reflector 10 and couple to the radiating elements 40. The active antenna unit 110 can also comprise cavity filters 60 that reside behind the reflector 10 and in front of the radio 50. A cover 50*c* can reside over a chamber facing a front of the radio 50. The radio 50 comprises internal radio circuitry in the chamber and can have a chassis 52 with thermally conductive fins 50*f*. For additional discussion of feed boards and/or cavity filters, see, PCT/CN2022/118993, filed Sep. 15, 2022, the contents of which are hereby incorporated by reference as if recited in full herein.

Still referring to FIGS. 1-5, a plurality of thermally conductive heat dissipation members 25 are directly or indirectly coupled to the reflector 10 and project forward of the reflector body 10*b*. The heat dissipation members 25 can function as "heat pipes" to direct heat H in the directions shown by the arrows indicating heat flow "H" in FIG. 1. Heat H from the radio 50 travels through the cavity filters 60 to the reflector 10, then to the heat dissipation members 25, then out to air/the environment.

In some embodiments, the heat dissipation members 25 can be provided in a number in a range of 1-30, shown as 4-9, but more or less heat dissipation members 25 may be provided.

The heat dissipation members 25 can be parallel to each other and extend in a longitudinal direction, laterally spaced apart, one on each side of each column 40*c* or radiating elements 40.

In other embodiments, the heat dissipation members 25 can extend laterally, longitudinally spaced apart, one on each side of each row 40*r* of radiating elements 40.

In some embodiments, the heat dissipation members 25 comprising the FSS 27 can be configured to box respective the radiating elements 40 so that the heat dissipation members 25 cross each other in rows and columns in a grid pattern (not shown).

The heat dissipation members 25 can have front ends 25*f* that project forward a distance outside the radome 30. The heat dissipation members 25 can be sealably attached to the radome 30 by any suitable interface. As shown in FIG. 1, a seal member 35 such as a grommet 35*g* can sealably attach to the radome 30 and provide a channel 35*c* that slidably receives and sealably couples to a respective heat dissipation member 25 to define a seal interface. Other seal configurations may be used including, by way of example only, overmolds, O-rings, gaskets and other sealants.

The reflector 10 can comprise metal and can be formed of an extruded metal body or a sheet metal body, such as metal comprising or defined by aluminum.

The heat dissipation members 25 can have a back portion 25*b* and a front portion 25*f*. The back portion 25*b* can couple to the reflector 10, optionally through a heat conductive gasket. The front portion 25*f* can be external to the radome 30. The back portion 25*b* can comprise a solid metal portion 26 that can define an RF isolation fence for some of the radiating elements 40. The solid metal portion 26 can terminate a distance “D” behind a front surface 40*f* of the radiating element 40. The solid metal portion 26 can merge into a frequency selective surface (FSS) 27 that allows RF energy from the radiating elements 40 to propagate therethrough. The FSS 27 can be provided as a grid pattern or array 27*a* of unit cells 27*u* in a metal substrate. The heat dissipation members 25 can be extruded and the grid pattern formed therein such as machined or acid etched. The heat dissipation members 25 can be die cast. The heat dissipation members 25 can be formed by shaped sheet metal with punched or stamped grid pattern forming the array 27*a* of unit cells 27*u*.

Referring to FIGS. 2-5, the heat dissipation members 25 can be coupled to the reflector body 10*b* to provide a reflector assembly 10*a* that also comprises the radiating elements 40. The heat dissipation members 25 can reside inside the radome 30 and extend along and across a length and width dimension L, W, respectively, of the radome 30 and are not required to be positioned only about an outer perimeter of the radome 30.

Figure 5:
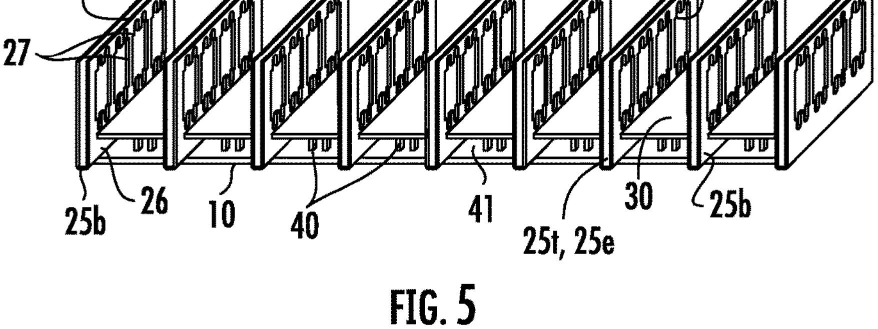
FIG. 5 is a side perspective view of components of a portion of the active antenna unit shown in FIG. 1 according to embodiments of the present invention.
Figure 6:
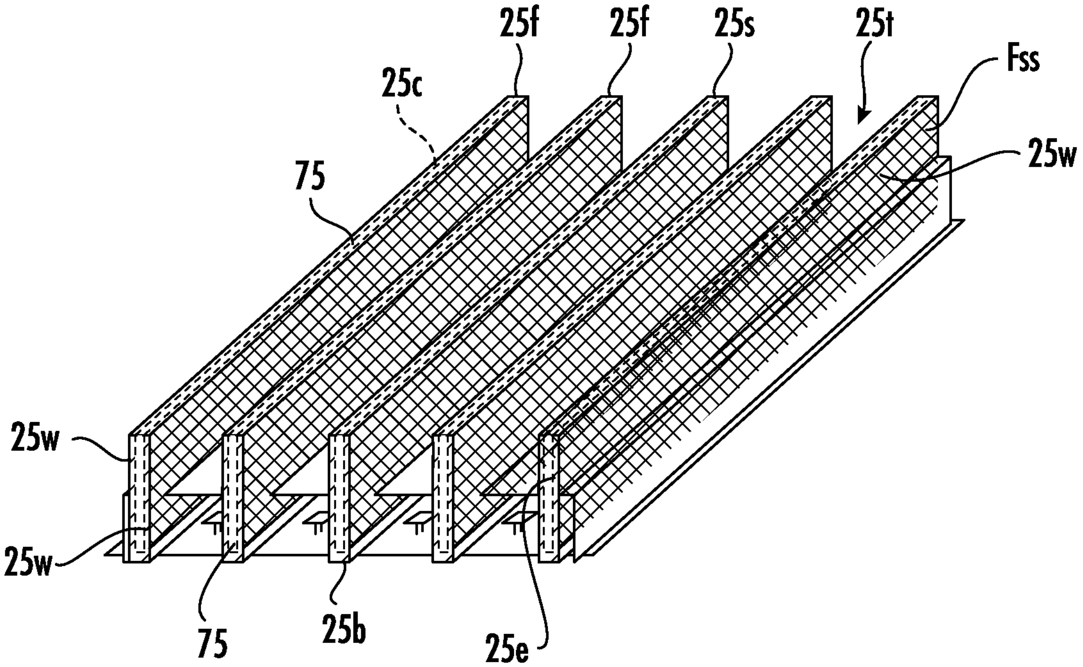
FIG. 6 is a side perspective view of the components of the active antenna unit shown in FIG. 3, similar to FIG. 4, and illustrating by broken lines, example underlying channels of the heat dissipation members that are closed to the external environment by an air-breathable, water-resistant material according to embodiments of the present invention.
Figure 7:
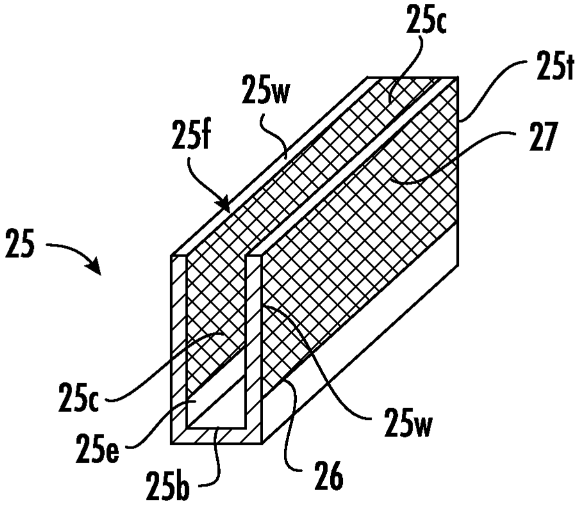
FIG. 7 is a side perspective view of one of the heat dissipation members shown in FIG. 6, shown without the air-breathable, water-resistant material.

Referring to FIGS. 5-7, a respective heat dissipation member 25 can have a pair of adjacent spaced apart walls 25*w* that extend in a front-to-back direction of the base station antenna 100 and/or active antenna unit 110 from a back portion 25*b* to a front portion 25*f* with a channel 25*c* therebetween. The heat dissipation members 25 can have an elongated “U” shaped body and the opening of the “U” can face forward. The FSS 27 can define at least 50% of each of the walls 25*w* to be substantially “RF transparent” to the RF energy of the radiating elements 40, such as radiating elements configured to operate in a high frequency band whereby the RF signal can propagate through the FSS without degrading performance of the radiating elements 40. The walls 25*w* with the FSS 26 can have at least a portion that is exposed to air outside the radome 30. The FSS 27 can be arranged to define a band pass filter for a target frequency band associated with the radiating elements 40.

The FSS 27 is configured to allow RF energy (electromagnetic waves) to pass through at one or more defined frequency range. See, e.g., Ben A. Munk, Frequency Selective Surfaces: Theory and Design, ISBN: 978-0-471-37047-5; DOI:10.1002/0471723770; April 2000, Copyright © 2000 John Wiley & Sons, Inc. the contents of which are hereby incorporated by reference as if recited in full herein. For additional discussion of example FSS configurations, see co-pending PCT/CN2022/080578, filed Mar. 14, 2022, the contents of which are hereby incorporated by reference as if recited in full herein.

Figure 8A:
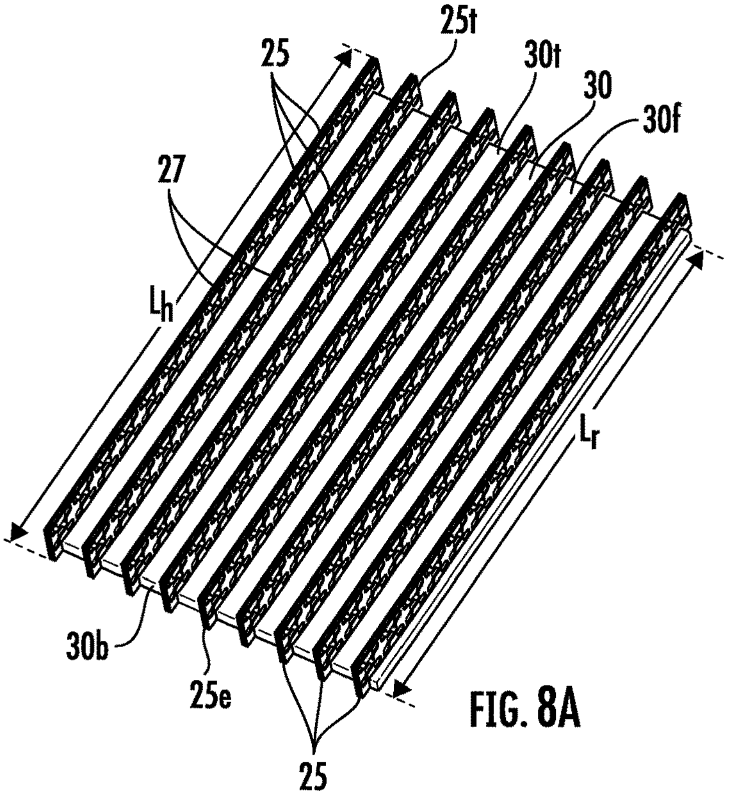
FIG. 8A is a front, side perspective view of an example front portion of an active antenna unit according to embodiments of the present invention.
Figure 8B:
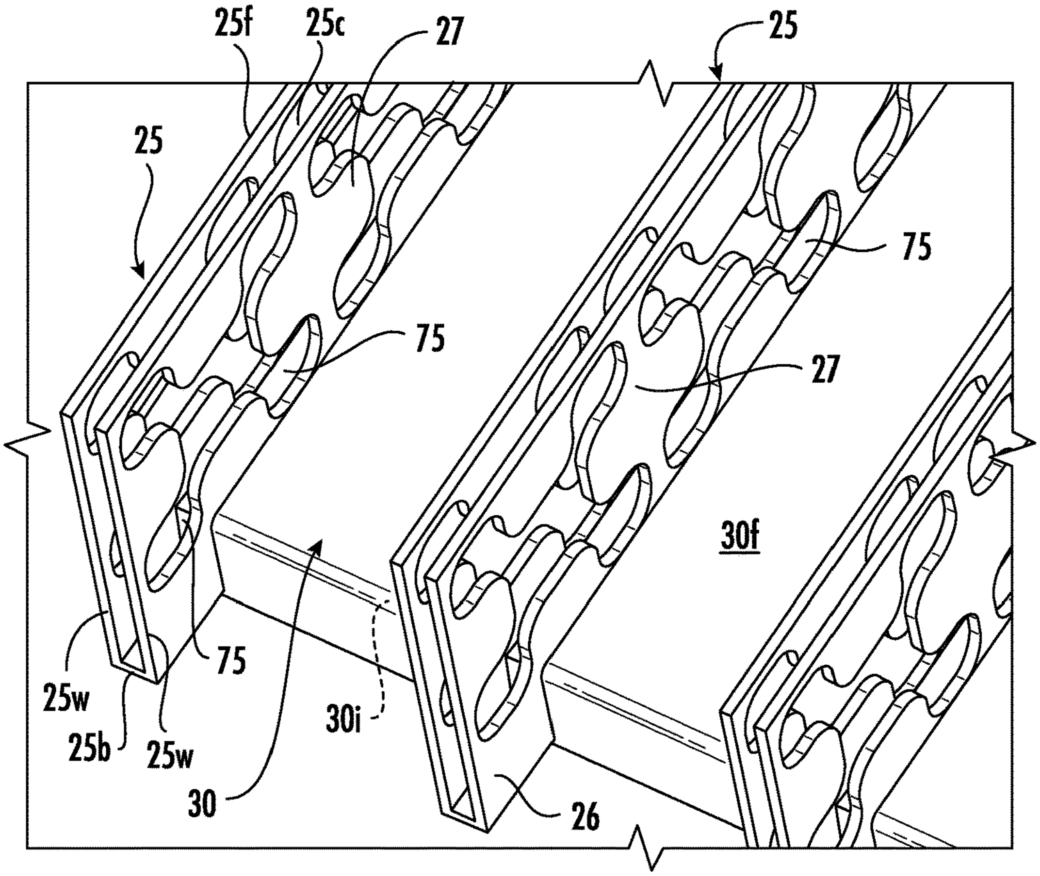
FIG. 8B is an enlarged front corner portion of the active antenna unit shown in FIG. 8A according to embodiments of the present invention.
Figure 9A:
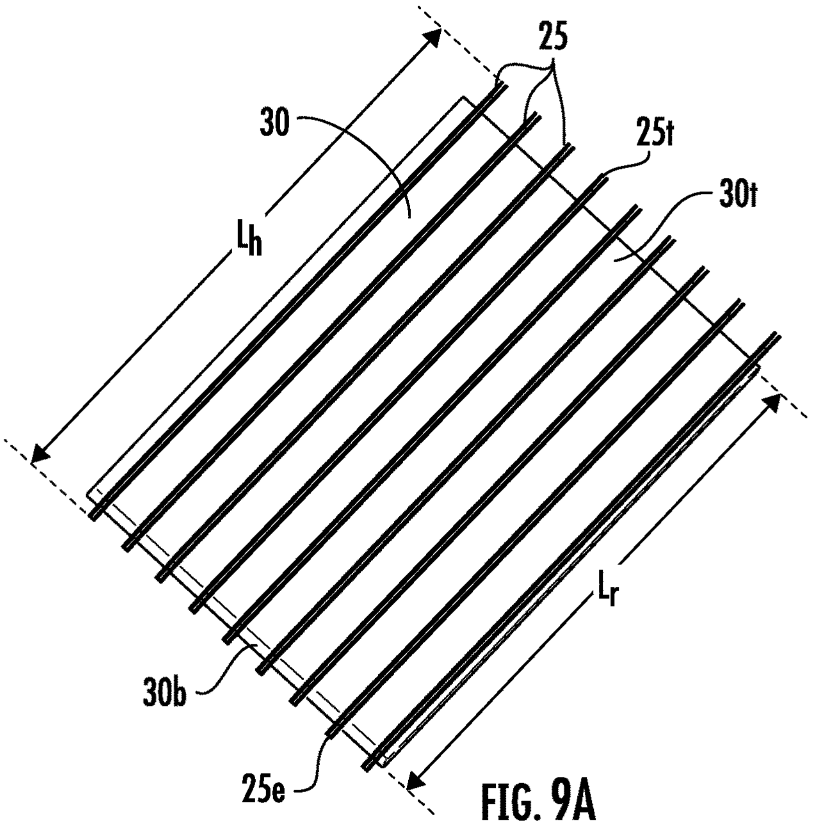
FIG. 9A is a front, side perspective view of an example front portion of an active antenna unit according to embodiments of the present invention.
Figure 9B:
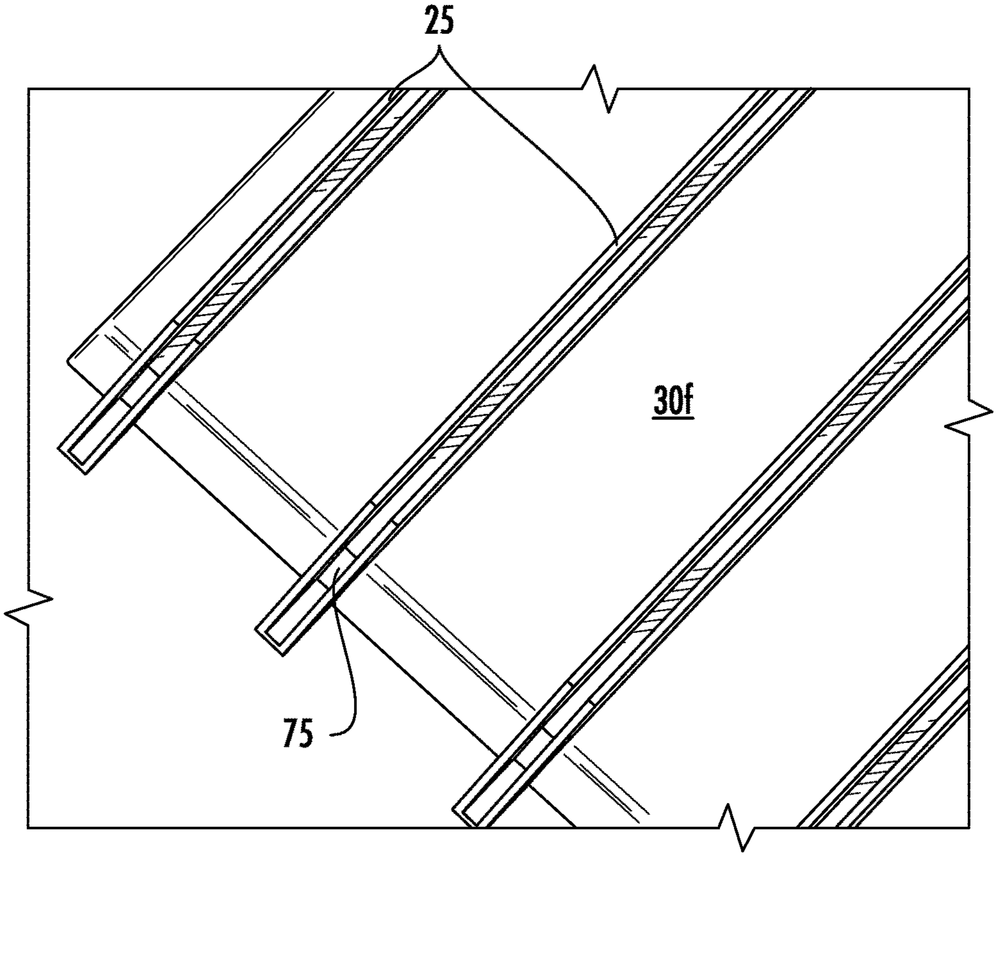
FIG. 9B is an enlarged front corner portion of the active antenna unit shown in FIG. 9A according to embodiments of the present invention.

In some embodiments, a sealant material 75 can be coupled to each heat dissipation member 25 to define a seal interface with the radome 30 to inhibit moisture/water from entering inside the radome 30. The sealant material 75 can be applied to a front surface 25*s* of the walls 25*w* and extend along and across the channel 25*c*, leaving at least part of the walls 25*w* outside the radome 30 exposed to environmental conditions. FIG. 6 shows the sealant material 75 on the front surface 25*s* across the channel 25*c* and on the top and bottom ends 25*t*, 25*e* of respective heat dissipation members 25. FIGS. 5 and 7 show the heat dissipation member(s) 25 without the sealant material 75. FIGS. 8B, 9B show the sealant material 75 partially recessed in the channel 25*c*.

The sealant material 75 can also be applied to an external or internal surface at the top 25*t* and bottom end 25*e* of the heat dissipation members 25 to block the channels 25*c* thereat, particularly for embodiments where the heat dissipation members 25 extend out the top 30*t* and bottom 30*b* the radome 30 (FIGS. 8A, 8B, 9A, 9B).

The sealant material 75 can be recessed in the channel 25*c* of the respective heat dissipation members 25 as shown in FIGS. 8B, 9B. The sealant material 75 can reside in the channel 25*c* and can be flush, behind or in front of the front 30*f* of the radome 30 and configured to seal the internal chamber 30*i* (FIGS. 1, 4) under the front 30*f* and sides 30*s* of the radome 30.

The sealant material 75 can be an air-breathable, water-resistant material of any suitable type. The sealant material 75 can comprise a material such as a water-proof breathable fabric membrane comprising expanded polytetrafluoroethylene (e-PTFE) such as GORE-TEX® or a light-weight material comprising synthetic flashspun high-density polyethylene fibers such as TYVEK®. The sealant material 75 can comprise foam. The sealant material 75 can comprise foam with an air breathable, water-resistant material and/or fabric.

Referring to FIGS. 8A, 8B, 9A, 9B, the heat dissipation member 25 can have a length dimension Lh that is greater than a length dimension Lr of the radome 30 with end portions 25*e* of the heat dissipation members 25 extending out of a top 30*t* and bottom 30*b* of the radome 30.

Turning now to FIGS. 10-13, another embodiment of the heat dissipation member 25' is shown. In this embodiment, the heat dissipation member 25' has a single wall 25*w* and the rear 25*b* is coupled to the reflector 10, optionally through a heat conductive gasket. The front 25*f* projects outward a distance from a front 30*f* of the radome 30'. As shown, the heat dissipation member 25' has a solid metal portion 26 and an FSS portion 27 as discussed with respect to FIGS. 1-6.

Figure 10:
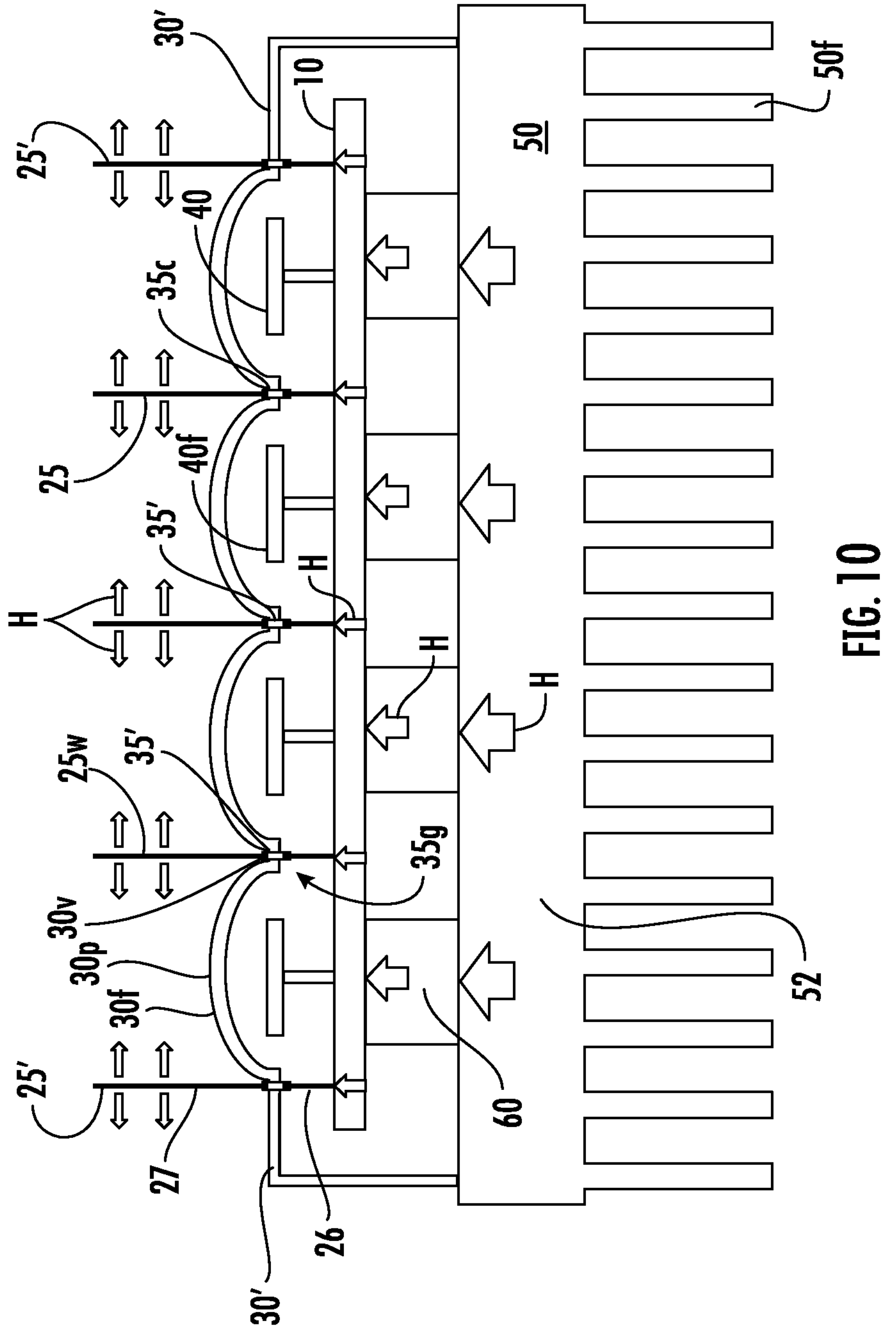
FIG. 10 is simplified lateral cross-section view of another embodiment of an active antenna unit with a heat transfer path according to embodiments of the present invention.
Figure 11:
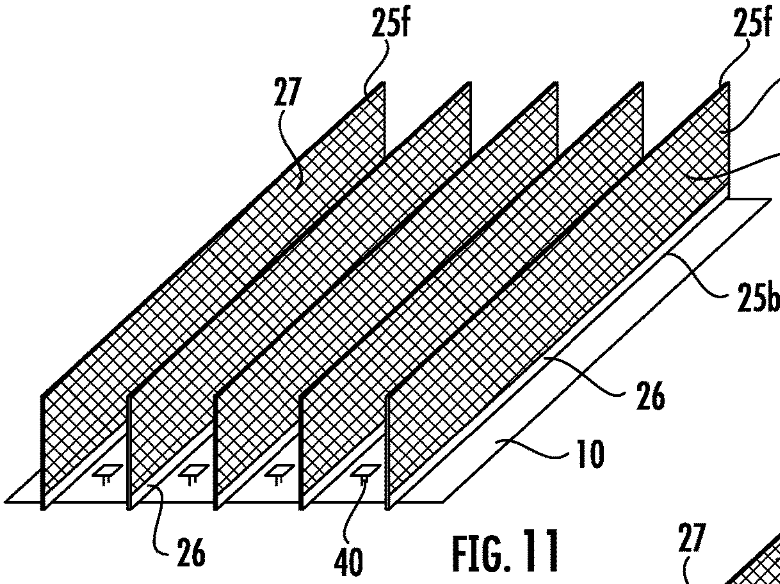
FIG. 11 is a side perspective view of components of the active antenna unit shown in FIG. 10, shown without the radome.
Figure 12:
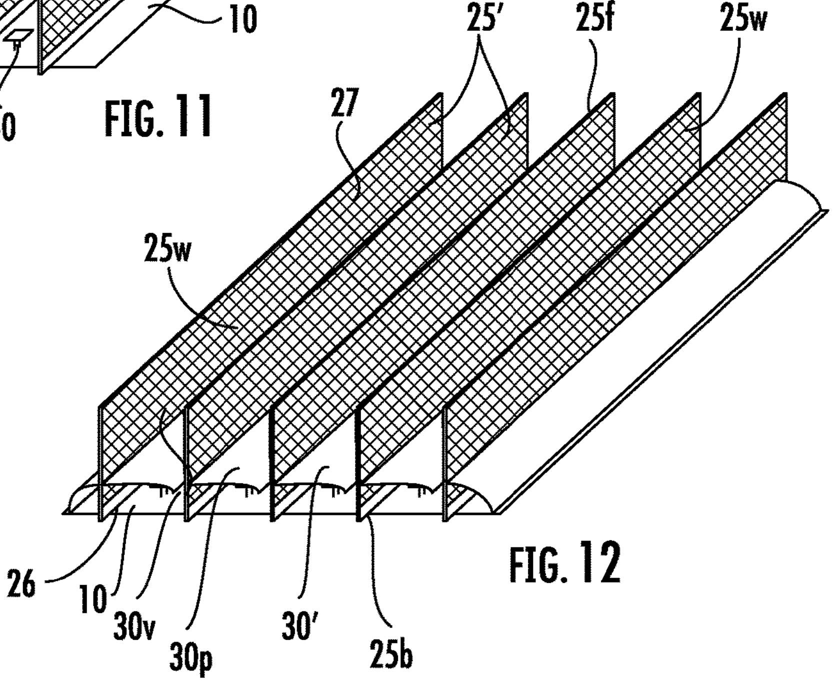
FIG. 12 is a side perspective view of components of the active antenna unit shown in FIG. 10, shown with the radome.
Figure 13:
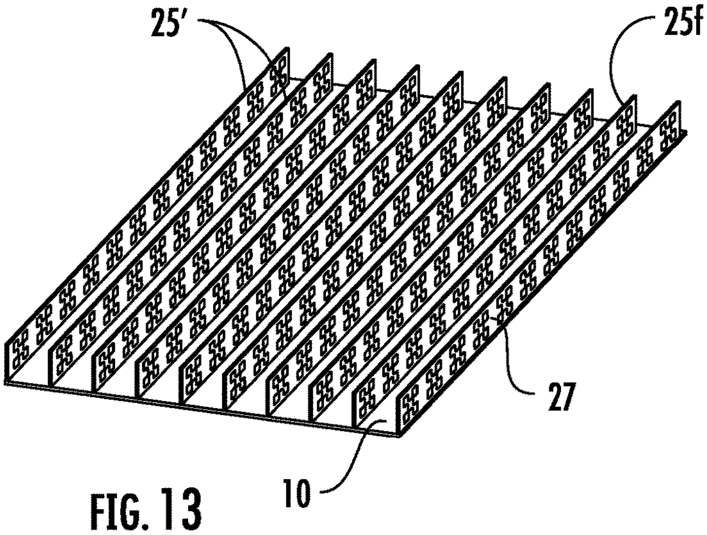
FIG. 13 is a side perspective view of the components of the active antenna unit shown in FIG. 10, shown without the radome and with an example grid pattern according to embodiments of the present invention.

The radome 30' can have a shaped front surface 30*f* with a series of laterally alternating and longitudinally extending peaks 30*p* and valleys 30*v*. One of at least some of the heat dissipation members 25' can extend out of a respective valley 30*v*. The heat dissipation members 25' can be sealably attached to the radome 30 by any suitable interface. As shown in FIG. 10, a seal member 35' such as grommet 35*g* can sealably attach to the radome 30 and provide a channel 35*c* that slidably receives and sealably couples to a respective heat dissipation member 25' to define a seal interface. Other seal configurations may be used including, by way of example only, overmolds, O-rings, gaskets and other sealants.

Figure 14A:
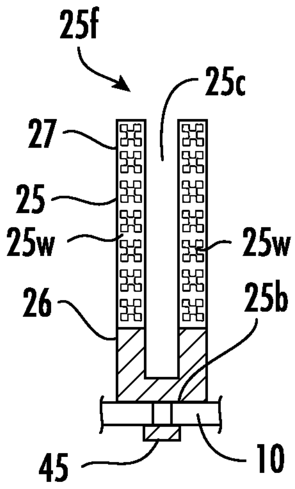
FIGS. 14A-14C are enlarged schematic views of example connections between a reflector and a heat dissipation member according to embodiments of the present invention.
Figure 14B:
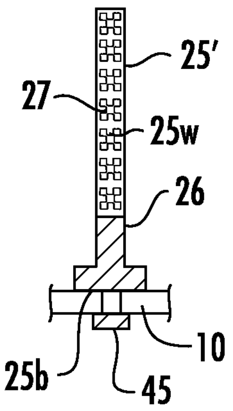
Figure 14C:
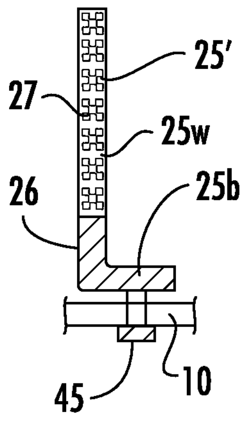

FIGS. 14A-14C show that a respective heat dissipation member 25, 25' can have a rear or back portion 25*b* that is attached to the reflector 10 using a metal fastener such as a bolt. A metal or thermally conductive gasket on a front and/or rear surface of the reflector 10 may be used with the fastener 45 (not shown) to facilitate heat conduction. FIGS. 14B and 14C also show example rear or back portions 25*b* of the single wall 25*w* heat dissipation member 25'. FIG. 14B shows a “T” shape rear or back portion 25*b* for mounting to the reflector 10 while FIG. 14C illustrates an “L” shape rear or back portion 25*b* for mounting to the reflector 10. The heat dissipation members 25 can be attached to the reflector body 10*b* using other attachment configurations including, for example, rivets, welds, solder joints, brazing, chemical bonding and the like. For riveting, a TOX® riveting process may be used to facilitate a suitable seal configuration. The TOX riveting process is a cold joining process also known as "TOX®-Clinching" where during clinching or press joining, the metals to be joined are connected force- and positive-locked with each other in a continuous forming process.

Figure 15A:
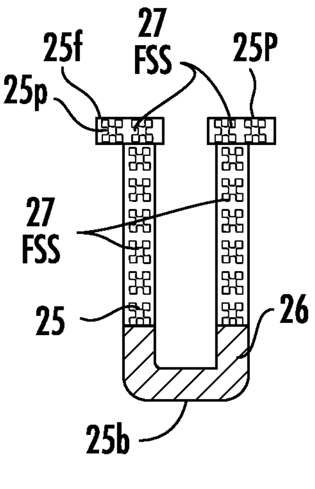
FIGS. 15A and 15B are enlarged schematic views of other example configurations of heat dissipation members according to embodiments of the present invention.
Figure 15B:
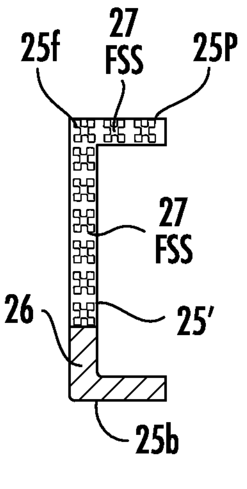

FIGS. 15A and 15B show that the front end 25*f* of the respective heat dissipation members 25, 25' can have surfaces 25*p* that are parallel to a plane of the primary surface of the reflector 10. These surfaces 25*p* can also comprise the FSS 27.

Turning now to FIGS. 16A, 16B, 16C and 17A, another embodiment of the active antenna unit 110' is shown. In this embodiment, the heat dissipation member 25" is provided as an external front cover 125 with an FSS 27 that resides in front of the radome 30. The heat path H can be from the radio 50 to the cavity filters 60, then to the reflector 10, then to the grid cover 125 to ambient air.

The reflector 10 can have outwardly extending legs 14 that are extensions of the reflector body 10*b* or that are attached thereto and that are attached to or merge into support members 1125 that extend in a front to back direction and are coupled to the front cover 125. If the legs 14 are provided as components that are mechanically attached to the reflector 10, they can reside in front or behind the reflector 10 and be attached via a fastener(s) 45 as discussed above with respect to other heat dissipation members.

Figure 16A:
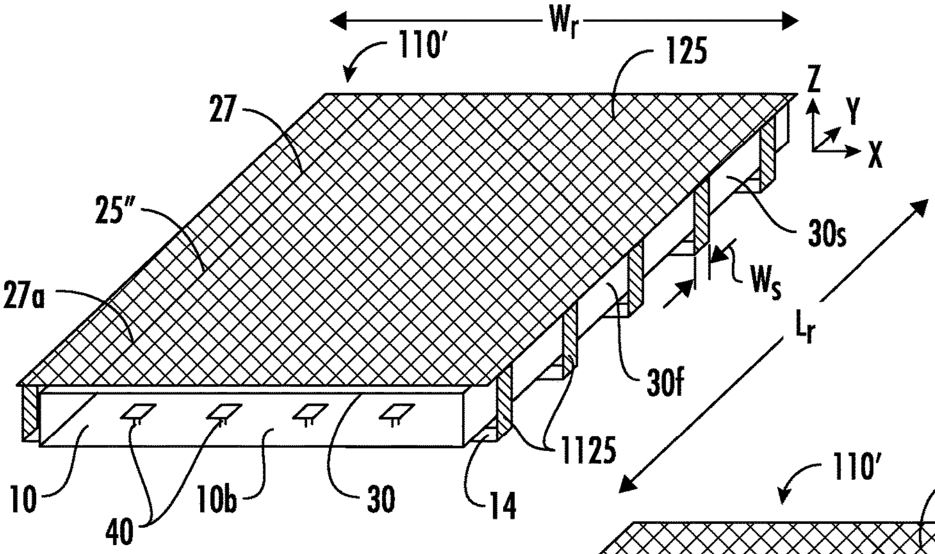
FIG. 16A is a side perspective view of another embodiment of an active antenna unit with an external cover in front of the radome according to embodiments of the present invention.
Figure 16B:
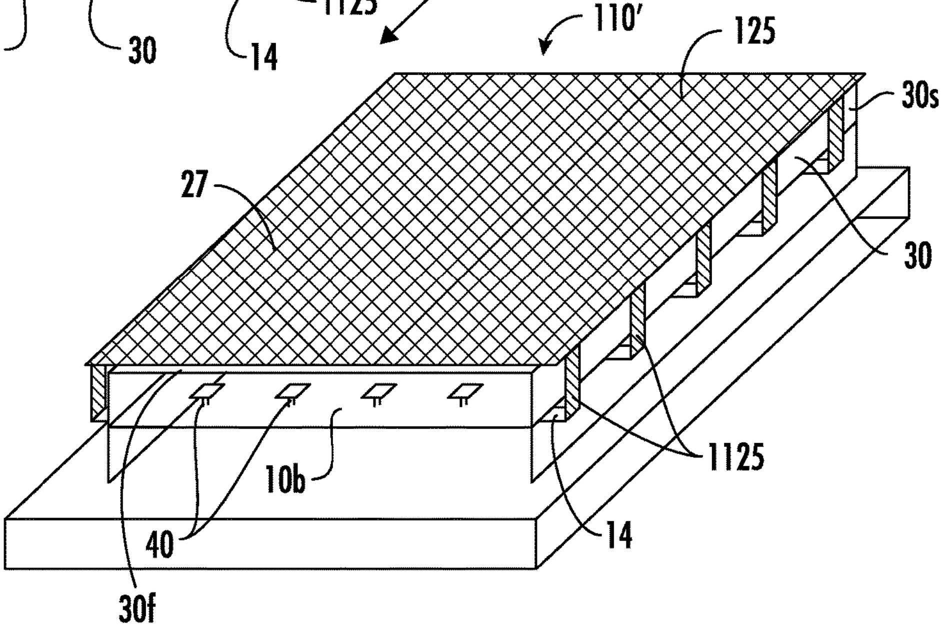
FIG. 16B is a side perspective view of another embodiment of an active antenna unit with the external cover in front of the radome according to embodiments of the present invention.
Figure 16C:
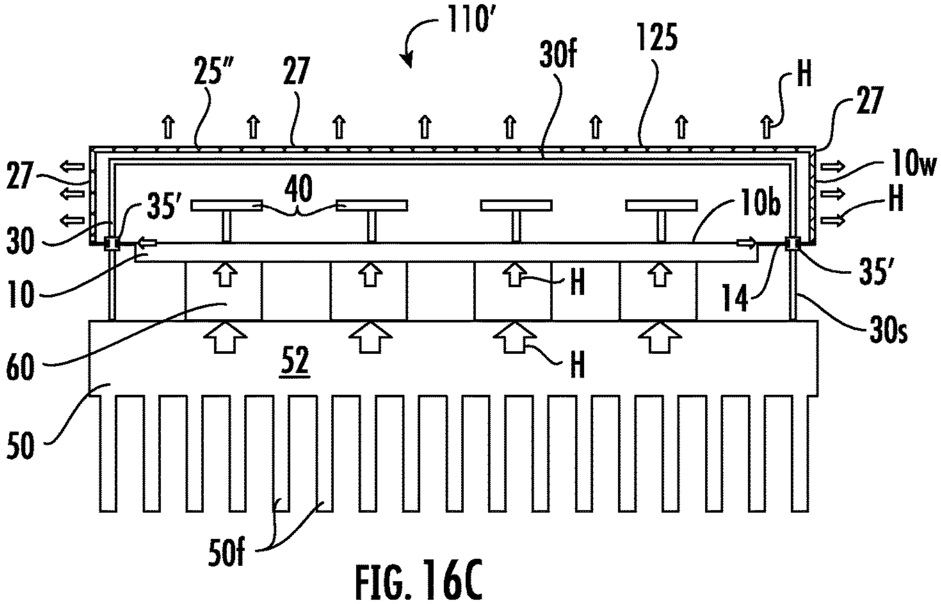
FIG. 16C is a simplified lateral section view of the active antenna unit shown in FIG. 16B.

As shown in FIG. 16C, the legs 14 can extend through the radome side wall 30*s* and may extend through a seal 35' in the sidewall 30*s* to seal the interface of the legs 14 to the radome side wall 30*s*.

The radome side wall 30*s* can extend behind the reflector 10 and behind the cavity filters 60 and can couple to the radio 50 as shown in FIGS. 16B, 16C. The radome side wall 30*s* may terminate adjacent the reflector body 10*b* as shown in FIG. 16A.

In other embodiments, the reflector 10 can be configured to have one or more sidewalls that extend in a front to back direction, perpendicular to the reflector body 10*b*, and that merge into the front cover 125. The radome 30 can sit within the sidewall(s) 10*w* over the reflector body 10*b* and behind the front (FSS) cover 125.

The front cover 125 can extend across an entire width Wr and length Lr of the front 30*f* of the radome 30. The frequency selective surface 27 can be parallel to a primary surface of the reflector body 10*b*.

The support members 1125 can have a small width Ws (in a longitudinal or Y dimension) and be fully metal components or have a wider width and comprise an FSS 27.

The frequency selective surface 27 of the heat dissipation member(s) 25, 25', 25" can have different patterns over different portions or may have a continuous repeating pattern.

The radiating elements 40 can be patch radiating elements. The radiating elements can be provided as an array of massive Multiple Input Multiple Output (mMIMO) radiating elements. The radiating elements 40 can operate in a defined high-band frequency band. A center operating frequency of the defined frequency band can be in a range of 3.1-4.2 GHz.

Figure 17A:
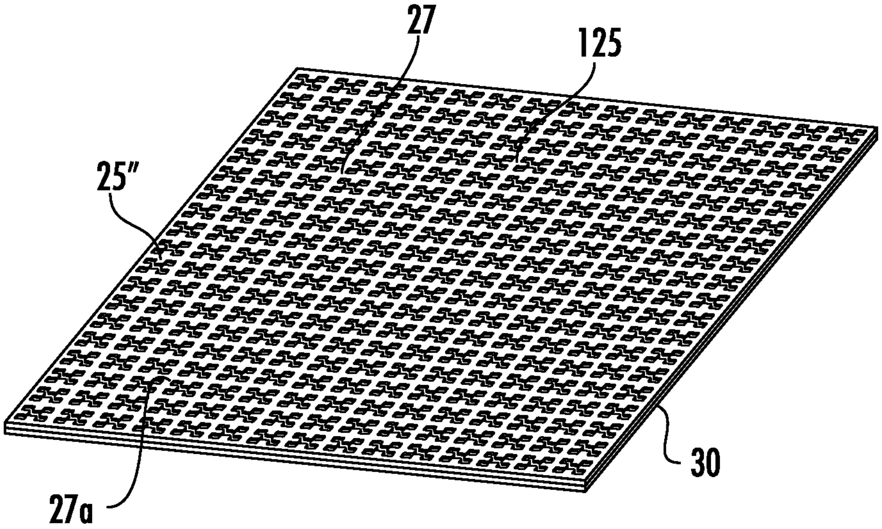
FIG. 17A is a side perspective of a portion of the external cover over the front radome shown in FIG. 16A, 16B.
Figure 17B:
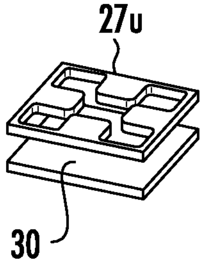

FIG. 17B illustrates an enlarged unit cell 27*u* of the array or grid of unit cells 27*a* providing the FSS 27.

Figure 18:
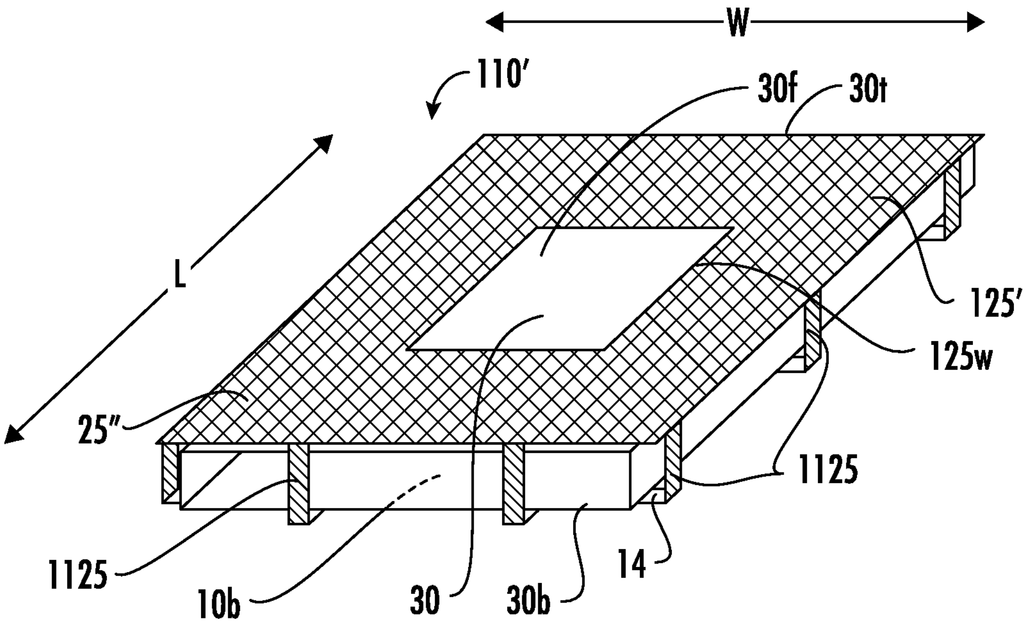
FIG. 18 is a side perspective view of another embodiment of an active antenna unit with another embodiment of the external front cover in front of the radome according to embodiments of the present invention.

FIG. 18 illustrates another embodiment of the external cover 125 shown in FIG. 16. In this embodiment, the external cover 125' can be provided with a window 125*w* so that the external cover 125' is not required to extend across an entire width W and length L of the front 30*f* of the radome 30. The frequency selective surface 27 can be parallel to a primary surface of the reflector body 10*b* and can extend over at least 50% of a length L and width W of the front of the radome.

It is noted that the term "active antenna unit" is interchangeably referred to herein as an "active antenna module". Active antenna modules may be deployed as standalone base station antennas or may be deployed in base station antennas configured as larger antenna structures that include additional active antenna modules and/or conventional "passive" antenna arrays that may be connected to radios that are external to the antenna structures.

The active antenna unit 110 with the radio 50 can be configured as a 5G module in some embodiments. With the introduction of fifth generation ("5G") cellular technologies, base station antennas are now routinely being deployed that have active beamforming capabilities. Active beamforming refers to transmitting RF signals through a multi-column array of radiating elements in which the relative amplitudes and phases of the sub-components of an RF signal that are transmitted (or received) through the different radiating elements of the array are adjusted so that the radiation patterns that are formed by the individual radiating elements constructively combine in one or more desired directions to form narrower antenna beams that have higher gain. With active beamforming, the shape and pointing direction of the antenna beams generated by the multi-column array may, for example, be changed on a time slot-by-time slot basis of a time division duplex ("TDD") multiple access scheme. Moreover, different antenna beams can be generated simultaneously on the same frequency resource in a multi-user MIMO scenario. More sophisticated active beamforming schemes can apply different beams to different physical resource blocks that are a combination of time and frequency resources by applying the beam vector in the digital domain. Base station antennas that have active beamforming capabilities are often referred to as active antennas. When the multi-column array includes a large number of columns of radiating elements (e.g., sixteen or more), the array is often referred to as a massive MIMO array. A module that includes a multi-column array of radiating elements and associated RF circuitry (and perhaps baseband circuitry) that implement an active antenna is referred to herein as an active antenna module.

Figure 19:
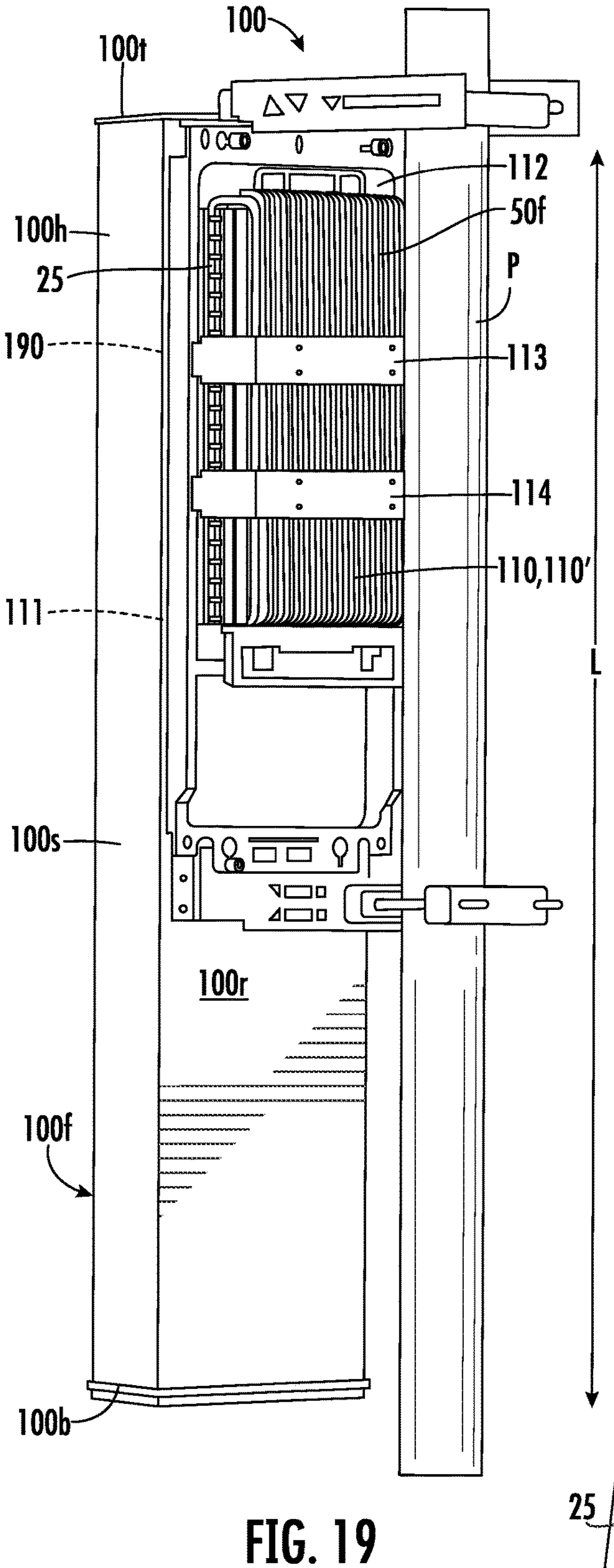
FIG. 19 is a rear perspective view of a base station antenna comprising an active antenna unit with the reflector assembly held at least partially external to the passive housing according to embodiments of the present invention.

Referring to FIG. 19, a base station antenna 100 according to some embodiments is shown. The base station antenna 100 includes a passive antenna assembly 190 with a plurality of internal linear arrays 111 of radiating elements arranged in a plurality of laterally spaced apart and adjacent longitudinally extending columns between a top 100*t* and a bottom 100*b* of the base station antenna 100. In an example embodiment, there are eight columns of linear arrays 111 of radiating elements.

The active antenna unit 110 can be held against a rear 100*r* of a housing 100*h* of the base station antenna 100 comprising the passive antenna assembly with a bracket assembly 112 having first and second laterally extending spaced apart brackets 113, 114. The housing 100*h* has a front surface 100*f* defining a radome and sides 100*s* and a rear 100*r*. The bracket assembly 112 can also mount the base station antenna housing 100*h* with the active antenna unit 110 to a target structure such as a pole P. The heat dissipation member(s) 25, 25', 25" can face the rear 100*r* of the housing 100*h*.

Figure 20:
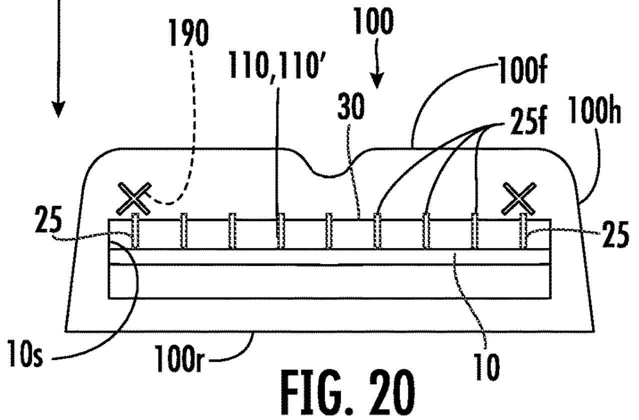
FIG. 20 is a simplified lateral cross-section view of a base station antenna with the active antenna unit with the reflector assembly held inside the base station antenna according to embodiments of the present invention.

FIG. 20 illustrates another embodiment of a base station antenna 100 with a housing 100*h* comprising a passive antenna assembly 190 sized and configured to hold the active antenna unit 110 at least partially internally thereof. In some embodiments, the heat dissipation member(s) 25, 25', 25" can be held at least partially inside the base station antenna housing 100*h* without requiring any or all the components of the active antenna unit 110.

The base station antenna 100 can include one or more arrays of low-band radiating elements, one or more arrays of mid-band radiating elements, and one or more arrays of high-band radiating elements. The radiating elements may each be dual-polarized radiating elements. Further details of radiating elements can be found in co-pending WO 2019/236203 and WO 2020/072880, the contents of which are hereby incorporated by reference as if recited in full herein. For further details regarding example active antenna modules and base station antenna housings with passive antenna assemblies, see, co-pending U.S. patent application Ser. No. 17/209,562 and corresponding PCT Patent Application Serial Number PCT/US2021/023617, the contents of which are hereby incorporated by reference as if recited in full herein.

The linear arrays (of the active antenna unit 110) and/or 111 of the passive antenna assembly 190, can be provided as low, mid or high band radiating element. The high-band radiating elements may be configured to transmit and receive signals in the 3.3-4.2 GHz frequency band or a portion thereof and/or in the 5.1-5.8 GHz frequency band or a portion thereof. The mid-band radiating elements may be configured to transmit and receive signals in, for example, the 1.427-2.690 GHz frequency band or a portion thereof. The low-band radiating elements may be configured to transmit and receive signals in, for example, the 0.616-0.960 GHz frequency band or a portion thereof.

It will be appreciated that other types of radiating elements may be used, that more or fewer linear arrays may be included in the antenna, that the number of radiating elements per array may be varied, and that planar arrays or staggered linear arrays may be used instead of the "straight" linear arrays illustrated in the figures in other embodiments.

Figure 21:
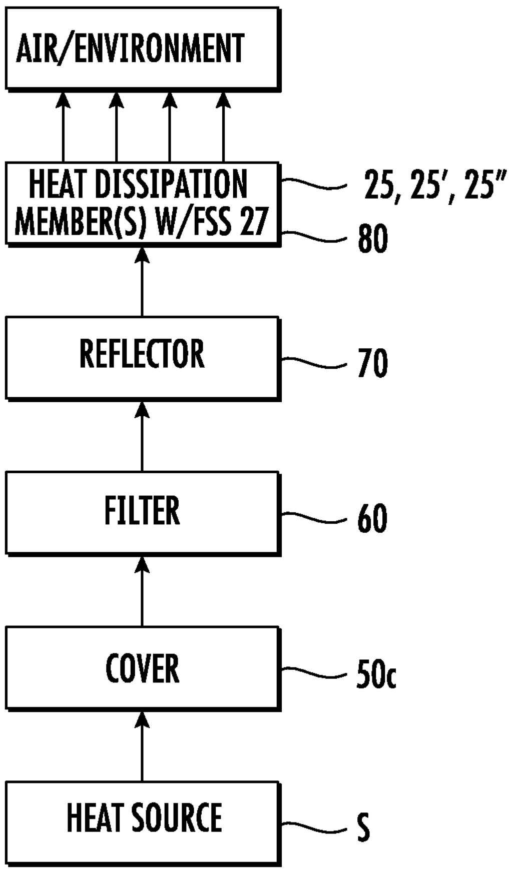
FIG. 21 is a box diagram of an example thermal (heat) flow path of an antenna according to embodiments of the present invention.

FIG. 21 is a block diagram of the thermal/heat path whereby "H" (heat) from a heat source(s) S such as a radio, travels from the radio 50, through a cover 50*c* on the radio 50 between radio circuitry in the radio 50 and filter(s) 60. The filter(s) 60 can be resonant cavity filters as is known to those of skill in the art. The cover 50*c* may be provided by a rear surface of the filter(s) 60 or by a separate cover and may be metal.)

The radome 30, 30' can be a dielectric material and may comprise polymeric or copolymeric material. The radio housing 50*h* and reflector body 10*b* and heat dissipation member(s) 25, 25', 25" can be metal.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

In the discussion above, reference is made to the linear arrays of radiating elements that are commonly included in base station antennas. It will be appreciated that herein the term "linear array" is used broadly to encompass both arrays of radiating elements that include a single column of radiating elements that are configured to transmit the sub-components of an RF signal as well as to two-dimensional arrays of radiating elements (i.e., multiple linear arrays) that are configured to transmit the sub-components of an RF signal. It will also be appreciated that in some cases the radiating elements may not be disposed along a single line. For example, in some cases a linear array of radiating elements may include one or more radiating elements that are offset from a line along which the remainder of the radiating elements are aligned. This "staggering" of the radiating elements may be done to design the array to have a desired azimuth beamwidth. Such staggered arrays of radiating elements that are configured to transmit the sub-components of an RF signal are encompassed by the term "linear array" as used herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The term "about" with respect to a number, means that the stated number can vary by +/−20%.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A reflector assembly for a base station antenna, comprising:

a reflector body;

at least one heat dissipation member coupled to and residing forward of the reflector body, wherein the at least one heat dissipation member comprises a frequency selective surface; and a radome residing in front of the reflector body, wherein the at least one heat dissipation member is thermally coupled to the reflector body and has a portion that is external to and resides in front of the radome.

2. The reflector assembly of claim 1, wherein the at least one heat dissipation member is a plurality of heat dissipation members that are laterally and/or longitudinally spaced apart across a respective width and/or length dimension of the reflector body.

3. The reflector assembly of claim 1, further comprising an array of radiating elements that project forward of the reflector body, wherein the at least one heat dissipation member comprises a first heat dissipation member that resides between a first row or column of radiating elements of the array of radiating and a second row or column of radiating elements.

4. The reflector assembly of claim 1, wherein the at least one heat dissipation member is provided as an external cover arranged with the frequency selective surface residing in front of and across at least part of the radome, and wherein the external cover has a rearward portion that is thermally coupled to the reflector body.

5. The reflector assembly of claim 4, wherein at least part of the frequency selective surface is parallel to a primary surface of the reflector body and extends over at least 50% of a length and width of the front of the radome.

6. The reflector assembly of claim 4, further comprising a plurality of metal legs that extend laterally from the reflector body and couple to a plurality of spaced apart support members that reside outside the radome and that extend in a front-to-back direction of the base station antenna.

7. The reflector assembly of claim 1, wherein the at least one heat dissipation member is metal, and wherein the frequency selective surface is provided as an array of unit cells.

8. The reflector assembly of claim 1, further comprising an array of radiating elements projecting forward of the reflector body inside the radome, wherein the at least one heat dissipation member comprises a wall with a first portion that extends inside the radome and a second portion that projects through an aperture in the radome to position the second portion to reside outside the radome.

9. The reflector assembly of claim 8, wherein the wall of the at least one heat dissipation member is provided by a pair of adjacent walls that are spaced apart and define a channel therebetween with a rear of the channel being closed and attached to the reflector body, and wherein a breathable, water-resistant material is coupled to a respective at least one heat dissipation member to seal the channel adjacent to and/or outside the radome.

10. The reflector assembly of claim 1, further comprising a plurality of radiating elements between the reflector body and the radome, wherein the radome comprises a seal member that slidably receives a respective heat dissipation member with part of the respective heat dissipation member residing outside the radome in front of the seal and another part resides inside the radome behind the seal member.

11. A reflector assembly for a base station antenna, comprising:

a reflector body; and at least one heat dissipation member coupled to and residing forward of the reflector body, wherein the at least one heat dissipation member comprises a frequency selective surface, wherein the at least one heat dissipation member comprises at least one wall that extends in a front-to-back direction of the base station antenna, wherein the at least one wall comprises a solid metal portion that merges into the frequency selective surface, and wherein the solid metal portion terminates behind a front surface the radiating elements and defines a radio frequency isolation fence.

12. An active antenna unit comprising:

a reflector body;

a plurality of radiating elements projecting forward of the reflector body;

a radome coupled to the reflector body and enclosing the plurality of radiating elements; and at least one heat dissipation member that is coupled to the reflector body, wherein the at least one heat dissipation member comprises a frequency selective surface which is at least partially outside the radome.

13. The active antenna unit of claim 12, further comprising a radio and cavity filters residing behind the reflector body.

14. The active antenna unit of claim 12, wherein the at least one heat dissipation member is a plurality of heat dissipation members, wherein the plurality of heat dissipation members each a have a solid metal rear portion that is coupled to the reflector body and that merges into the frequency selective surface at a location behind a front of the radiating elements, and wherein the plurality of heat dissipation members are laterally and/or longitudinally spaced apart across a width and/or length dimension of the reflector body.

15. The active antenna unit of claim 12, wherein the plurality of radiating elements are provided as an array of radiating elements that project forward of the reflector body, wherein the at least one heat dissipation member comprises a first heat dissipation member that resides between a first row or column of adjacent radiating elements of the array of radiating elements and a second row or column of adjacent radiating elements.

16. The active antenna unit of claim 12, wherein the at least one heat dissipation member is provided as an external cover with the frequency selective surface arranged to reside at least partially in front of the radome, and wherein the external cover is thermally coupled to the reflector body.

17. The active antenna unit of claim 16, wherein at least part of the frequency selective surface is parallel to a primary surface of the reflector body and extends over at least 50% of a length and width of the front of the radome.

18. The active antenna unit of claim 12, wherein the at least one heat dissipation member comprises at least one wall that extends in a front-to-back direction, wherein the at least one wall comprises a solid metal portion that merges into the frequency selective surface, and wherein the solid metal portion terminates behind a front surface the radiating elements and defines a radio frequency isolation fence.

19. The active antenna unit of claim 12, wherein the at least one heat dissipation member comprises a wall with a first portion that resides inside the radome and a second portion that projects forward through an aperture in the radome to reside outside the radome.

20. The active antenna unit of claim 19, wherein the wall of the at least one heat dissipation member is provided by a pair of adjacent walls that are spaced apart and define a channel therebetween with a rear of the channel attached to the reflector body, and wherein a breathable, water-resistant material is coupled to a respective at least one heat dissipation member to seal the channel adjacent to and/or outside the radome.

21. The active antenna unit of claim 12, wherein the active antenna unit further comprises a seal member with an open through channel coupled to the aperture of the radome that slidably receives a respective heat dissipation member.

22. A base station antenna comprising:

a passive antenna comprising a housing; and an active antenna unit comprising a radome and residing behind the housing, wherein the active antenna unit comprises at least one heat dissipation member comprising a frequency selective surface that is at least partially external to the radome and resides behind the housing.

* * * * *